(12) United States Patent
Greenwood

(10) Patent No.: US 6,626,793 B1
(45) Date of Patent: Sep. 30, 2003

(54) HYDRAULIC CONTROL CIRCUIT FOR A CONTINUOUSLY-VARIABLE-TRANSMISSION

(75) Inventor: Christopher John Greenwood, Preston (GB)

(73) Assignee: Torotrak (Development) Limited, Lancashire (GB)

( * ) Notice: Subject to any disclaimer, the term of this patent is extended or adjusted under 35 U.S.C. 154(b) by 0 days.

(21) Appl. No.: 09/678,483

(22) Filed: Oct. 4, 2000

Related U.S. Application Data

(63) Continuation of application No. PCT/GB99/01444, filed on May 7, 1999.

(30) Foreign Application Priority Data

May 8, 1998 (GB) .............................................. 9809959

(51) Int. Cl.$^7$ .............................................. F16H 15/38
(52) U.S. Cl. .......................................... 476/10; 476/42
(58) Field of Search ............................. 476/10, 41, 42

(56) References Cited

U.S. PATENT DOCUMENTS

| | | | |
|---|---|---|---|
| 5,090,951 A | * | 2/1992 | Greenwood ............... 476/10 X |
| 5,217,418 A | * | 6/1993 | Fellows et al. ............. 475/214 |
| 5,766,105 A | * | 6/1998 | Fellows et al. ............... 474/18 |
| 5,938,557 A | * | 8/1999 | Greenwood ................. 475/216 |

FOREIGN PATENT DOCUMENTS

| | | |
|---|---|---|
| DE | 195 34 391 | 3/1997 |
| GB | 2 312 257 | 10/1997 |
| GB | 2 312 258 | 10/1997 |
| WO | WO 91/14116 | 9/1991 |
| WO | WO 94/01697 | 1/1994 |
| WO | WO 95/17621 | 6/1995 |

* cited by examiner

Primary Examiner—David Fenstermacher
(74) Attorney, Agent, or Firm—Nixon & Vanderhye P.C.

(57) ABSTRACT

The present invention provides an hydraulic control circuit for a continuously-variable-ratio transmission An hydraulic control circuit for a CVT transmission includes a first hydraulic pressure control valve $V_1$ for controlling the pressure of hydraulic fluid to be supplied to the roller control pistons of the variator and a second hydraulic pressure control valve $V_2$ for controlling the pressure of hydraulic fluid to be supplied to a clutching arrangement of the transmission. Said valves $V_1$, $V_2$ are connected in flow series and by a first fluid directing valve means $V_3(S_1, S_2)$ for directing flow from each pump $P_L$, $P_R$ to a first point P upstream of valve $V_1$ or to a second point P downstream of valve $V_1$ but upstream of valve $V_2$. By adopting such an arrangement it is possible to control the clutches without affecting the roller position and vice versa.

26 Claims, 6 Drawing Sheets

PRIOR ART

HYDRAULIC CONTROL CIRCUIT FOR A CONTINUOUSLY-VARIABLE-TRANSMISSION

This application is a continuation of application Ser. No. PCT/GB99/01444 filed May 7, 1997.

BACKGROUND OF THE INVENTION

1. Field of the Invention

The present invention relates to an hydraulic control circuit for a continuously variable transmission and relates particularly, but not exclusively, to such a circuit for what is commonly referred to as a "full toroidal" continuously variable transmission. (CVT).

2. Discussion of Prior Art

Such CVT's comprise an input shaft for receiving power from, for example, an internal combustion engine and has mounted thereon a pair of spaced apart input discs and a pair of output discs mounted back to back between said input discs. The input discs rotate with the shaft but the output discs are mounted for free rotation on the shaft by means of a bearing or some such similar device. The confronting faces of the input and output discs are contoured to provide a concave surface or face, which mirrors that of the face facing it. The faces are either formed in a full or half toroidal manner and provide the surfaces between which a plurality of rollers are positioned for transmitting power between the input and the output discs. In at least the full toroidal design, the discs are hydraulically end loaded to ensure that traction is maintained between the discs and the roller. Additionally, the rollers themselves, whilst having a certain degree of freedom of movement are subjected to some degree of positional influence by an hydraulic actuator employing both the higher and the lower pressures within an hydraulic control circuit, such as disclosed in PCT GB/00956 or British Patent No. 2282196

The above arrangement is illustrated in FIG. 1, in which items 12, 14 are the input discs, item 16 is the input shaft and items 13, 20 are the output discs. The rollers are shown at 22 and a double acting hydraulic piston 24 employs the higher and lower pressures within an associated hydraulic circuit to influence the position thereof, thereby to vary the transmission ratio through the transmission. Hydraulic end load is provided by means of an hydraulic chamber 26 which, when supplied with hydraulic fluid under pressure acts to load input disc 14 towards the other input disc 12, thereby ensuring traction is maintained.

An hydraulic control suitable for the above arrangement is described in our own PCT application number PCT GB/00956, the main circuit of which is shown in FIG. 2 attached hereto. Whilst this arrangement need not be discussed in detail herein, it will be appreciated that valves 99 and 100 are connected in parallel and are operable either individually or together to vary the pressure within the hydraulic control circuit in order to influence the position of the rollers 22 and the hydraulic pressure being applied to either of two clutches 37, 43. The control is independent i.e. varying the hydraulic pressure in the clutches has no affect on the position of the rollers and vice versa.

SUMMARY OF THE INVENTION

It is an object of the present invention to provide an hydraulic control circuit for a continually variable transmission, which improves on the above design, by providing a control circuit capable of more rapid response to adverse operating conditions.

Accordingly, the present invention provides an hydraulic control circuit for a CVT transmission comprising:

first and second hydraulic supply pipes;

first and second hydraulic pumps, $P_L$, $P_R$ associated with said first and second supply pipes respectively for pumping hydraulic fluid therethrough and for raising its pressure;

a first hydraulic pressure control valve $V_1$ for controlling the pressure of hydraulic fluid to be supplied to the roller control of the variator;

a second hydraulic pressure control valve $V_2$ for controlling the pressure of hydraulic fluid to be supplied to a clutching arrangement of the transmission (backpressure control);

characterised in that said valves $V_1$, $V_2$ are connected in flow series and by a first fluid directing valve means ($S_1$, $S_2$) for directing flow from each pump $P_L$, $P_R$ to a first point upstream of valve $V_1$ or to a second point downstream of valve $V_1$ but upstream of valve $V_2$.

Advantageously, the first fluid directing valve means comprises two two-way valves $S_1$, $S_2$ and each having first and second outlets, each first outlet being connected for supplying fluid to said first point (upstream of $V_1$) and each second outlet being connected for supplying fluid to said second point (between $V_1$ and $V_2$).

Preferably, valve $V_1$ comprises a pressure raising valve for controlling pressure upstream thereof for supply to said variator and in which any flow through said valve $V_1$ is combined with any flow being directed directly to said second point for subsequent supply to said second (clutch control valve) $V_2$.

Advantageously, the circuit further includes flow restriction means R for restricting the flow of fluid in the direct supply between the fluid directing valve ($S_1$, $S_2$) and said second point such that the resistance in each branch is substantially equal to the total resistance in the supply route through valve $V_1$.

In a particularly advantageous arrangement, the circuit includes a further restrictor r within the supply to valve $V_1$ and the total resistance of r and the resistance in Valve $V_1$ is substantially equal to the resistance R and any resistance within each branch between the fluid directing valve means ($S_1$, $S_2$) and the second point ($P_2$).

Conveniently, the circuit further includes a vehicle deceleration monitor and switching means operable to switch the first fluid directing valve means to cause all the fluid from pumps $P_L$, $P_R$ to be directed to valve $V_1$ upon detection of vehicle deceleration.

Advantageously, the circuit includes switching means operable to switch the first fluid-directing valve means to cause all the fluid from pumps ($P_L$, $P_R$) to be directed to said second point rather than said first point.

In one arrangement the secondary fill point $S_{FP}$ is upstream of said first fluid directing valve means ($S_1$, $S_2$).

Advantageously, the circuit includes a flow restrictor $r_L$, $r_R$ in the supply to each clutch, thereby to maintain a predetermined pressure within the supply leading thereto. Preferably, each clutch supply includes a clutch fill valve $F_L$, $F_R$ between an associated pump and said clutch, said valve receiving fluid flow from said associated pump either via a primary fill point $P_{FP}$ downstream of said second point but upstream of valve $V_2$ or from a secondary fill point $S_{FP}$ downstream of said pumps but upstream of said first point $P_1$.

In one arrangement the secondary fill point $S_{FP}$ is upstream of said first fluid directing valve ($V_3$).

Whenever the circuit is provided with clutches it preferably includes a dump valve ($E_L$, $E_R$) for each clutch acting in a first position to direct flow to said associated clutch and in a second position acting to allow fluid to drain therefrom but preventing fluid flowing thereto.

Advantageously, the circuit includes control means for controlling valves $F_L$, $F_R$ so as to cause fluid to be supplied from the primary fill point $P_{FP}$ during a clutch fill step and from the secondary fill point $S_{FP}$ during a clutch engage step.

Additionally, the circuit may include control means for controlling the first fluid directing valve ($S_1$, $S_2$) to direct fluid from both pumps $P_1$, $P_2$ to a particular clutch $C_L$, $C_R$ via said secondary fill point $S_{FP}$.

Advantageously, the circuit further includes a fluid accumulator for receiving fluid flow once clutch engagement has been completed.

Preferably said accumulator receives fluid from a tertiary filling point $T_{FP}$ upstream of valve $V_2$ but downstream of the primary filling point $P_{FP}$.

Advantageously, when the above accumulator is employed, valve $V_2$ comprise a solenoid valve.

In a particularly advantageous arrangement the circuit further including a variable rate relief valve and in which valve $V_2$ comprises a solenoid valve, said valve $V_2$ in a first position acting to direct flow through said valve and to a sump and in a second position acting to direct fluid to said variable rate relief value.

Preferably, said variable rate relief valve comprises a spring loaded pressure relief valve having a "timing restrictor" circuit for receiving a portion f the flow and directing it to the spring side of the accumulator, thereby to assist the spring effect and increase the pressure within the hydraulic circuit.

Advantageously, said pressure relief valve includes a drain for draining any fluid accumulated on the spring side of said valve.

In a convenient arrangement, the circuit includes an hydraulic end load mechanism of a continuously-variable-transmission and said circuit includes means (highest wins valve) for supplying said end load mechanism with the higher of the two pressures created by pumps ($P_L$, $P_R$).

Preferably, the above arrangement includes a pressure sensitive valve ($H_W$) connected for receiving hydraulic fluid from both pumps $P_L$, $P_R$ and for directing only the fluid at the higher pressure to the end loading mechanism.

In addition to the above end load arrangement, the circuit may be provided with means for supplying said end load mechanism with fluid at the lowest pressure within the circuit as an alternative to fluid at the higher of the two pressures created by pumps $P_L$, $P_R$.

Advantageously, the hydraulic control circuit further includes switching means for switching the supply fluid being supplied to the end load mechanism between that at the lower pressure and that at the higher pressure.

In an alternative mode, the present invention comprises a continuously variable transmission having an hydraulic control circuit as described above.

BRIEF DESCRIPTION OF THE DRAWINGS

The present invention will now be more particularly described by way of example only with reference to the accompanying drawings, in which.

DETAILED DISCUSSION OF PREFERRED EMBODIMENTS

Figure 1:
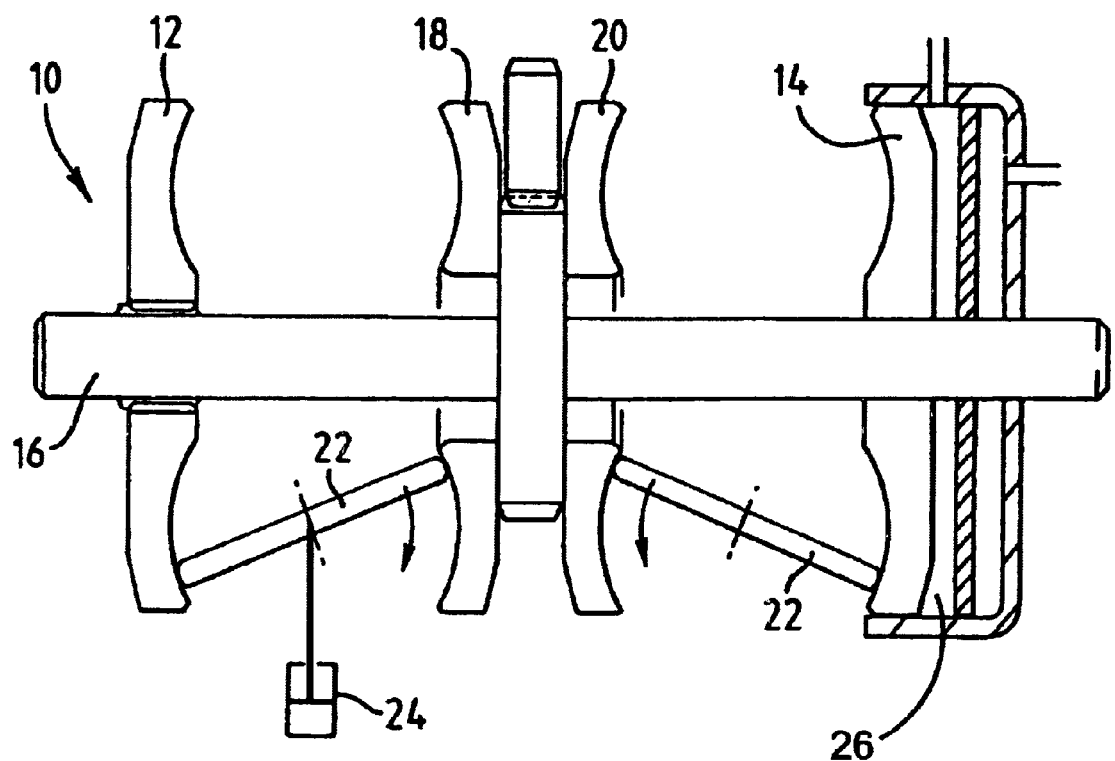
FIG. 1 is a schematic representation of a continuously variable transmission.
Figure 2:
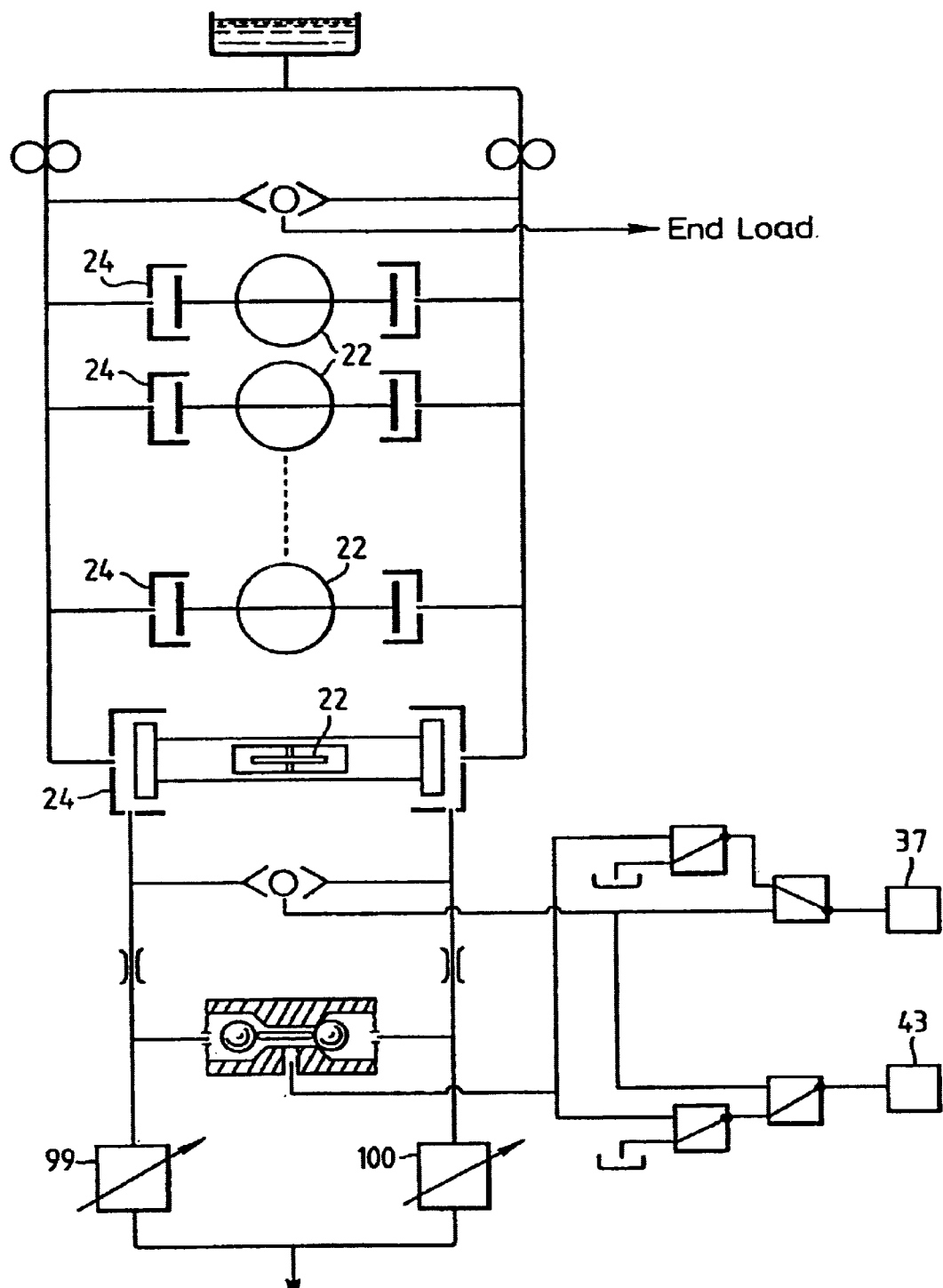
FIG. 2 is a diagrammatic representation of an hydraulic control circuit of the prior art.

Referring now to the drawing in general but particularly to FIG. 3, it will be appreciated that the present arrangement comprises a modification of that described above but adopts a similar strategy of control as will be described later herein. From the particular arrangement of FIG. 3 it will be appreciated that the present invention comprises a control circuit 30 having first and second fluid pumps $P_L$ $P_R$, each of which supplies fluid from a reservoir or sump 32 and directs it to first and second supply pipes 34, 36 respectively. At a downstream end of each of 34, 36 there is positioned a valving arrangement which may comprise a single or two individual solenoid valves $S_1$ $S_2$ respectively. In either arrangement, said valve or valves is/are arranged such that the supply from each of pumps $P_L$, $P_R$ may be selectively directed to either a first point $P_1$ upstream of a control valve $V_1$ or to a second point $P_2$ downstream of sad valve but upstream of a further valve $V_2$. Valves $V_1$ and $V_2$ (in some embodiments) are pressure raising valves, i.e. operation thereof restricts the flow therethrough and raises the pressure in the supply thereto whilst valve $S_1$, $S_2$ are simple solenoid valves having no effect on the line pressure. It is important to note that control valves $V_1$ and $V_2$ are connected in flow series as opposed to being arranged in parallel as disclosed in PCT GB/00956, mentioned above. The solenoid valves are clearly arranged to connect either or both of supply pipe 34, 36 to valve $V_1$ or $V_2$ and, in the connection arrangement shown in this figure $P_2 > P_1$ by the $\Delta P$ across $V_1$. The $\Delta P$ across $V_2$ sets the absolute pressures within the control circuit without affecting the $\Delta P$ across the pumps and has no effect on $V_1$ (unless flows from the pumps change, e.g. as a result of pressure relief valves). Consequently, $V_1$ may be employed as the variator control valve whilst $V_2$ may be employed as the clutch control valve. In such an arrangement, it is possible to provide fail-safe operation by setting the solenoid valves $S_1$, $S_2$ to the same point such that zero differential pressure is created across the pumps and no variator reaction force is thus created. Whilst the details of how valves $V_1$ and $V_2$ are operated in order to change the roller position and/or clutch engagement are described later herein, it is worth noting at this stage that variation of the back pressures created by each of these valves is employed in the control of roller position and/or control of clutch engagement. Clearly, in this arrangement any variation in the back pressure created by the clutch control valve $V_2$ will have absolutely no effect on the back pressure created by valve $V_1$ as differential pressure is used to control the variator. Consequently, clutch engagement may be achieved without affecting the position of the variator rollers.

Figure 4:
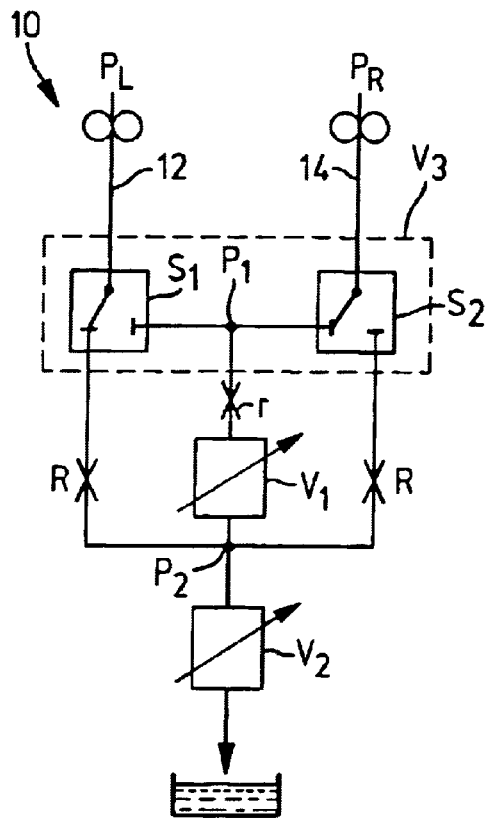
FIGS. 4 to 12 are hydraulic control circuits according to various individual aspects of the present invention, each of which may be used to modify the circuit of FIG. 3, as and when necessary or desirable.

It may be convenient in some circumstances to provide some form of fluid damping throughout the circuit and this is represented by restrictors R, r as shown in FIG. 4 but, for the purposes of clarity, not repeated further herein. Such resistance would be provided for the purpose of damping the variator roller motion and, for the connection as shown with zero demand applied to the valve $V_1$, the zero demand flow resistance of $V_1 = RV_1$ and for zero reaction (zero pump $\Delta p$) the resistance of the left-hand side will equal the resistance of the right-hand side, i.e. $R=r+RV_1$. Consequently, for a damping requirement of r, the value of R must equal $r+RV_1$ i.e. damping+valve minimum flow resistance. However, during an emergency stop when the back pressure due to variator roller motion must be minimised, this system can be set for minimum resistance to ratio change by setting both the solenoid $S_1$, $S_2$ to port H thus allowing free reverse flow and unrestricted fluid flow through from one line to the other which avoids pressurising/vacuum problems associated with the prior arrangements. Additionally, damped zero reaction is available by setting both the solenoid valves $S_1$, $S_2$ to port L. In order to achieve this affect, the present arrangement also includes a vehicle brake/decelleration monitor shown schematically at 16 and a switching means responsive to the a signal from said monitor 16 and shown schematically at 18 for initiating control of valves $S_1$ and $S_2$ in order to cause all the fluid from pumps $P_L$, $P_R$ to be directed to valve $V_1$ upon detection of vehicle braking/deceleration. For the purposes of clarity, these items are shown only in FIG. 5.

Figure 5:
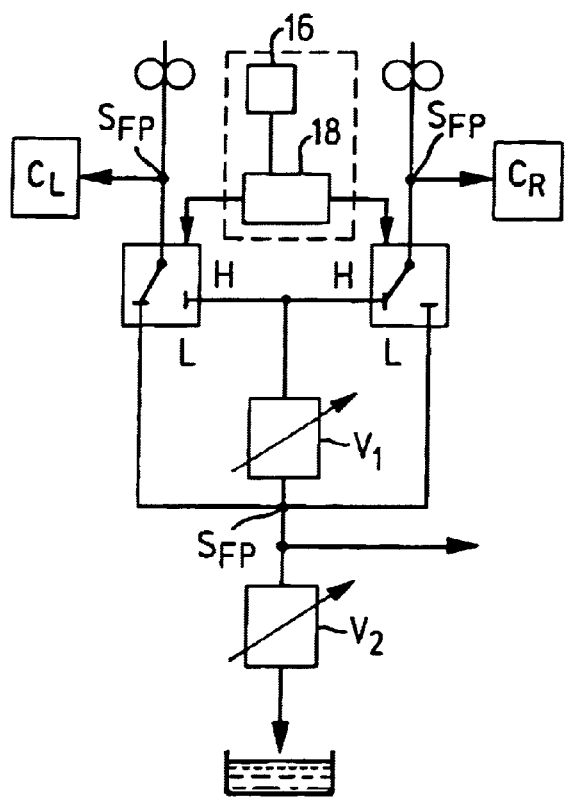

The arrangement of FIG. 5 illustrates one potential clutch hydraulic fluid connection arrangement in which the high and low regimes clutches (hereinafter referred to as clutches $C_R$ $C_L$) are connected directly to supply pipes 12, 14 immediately downstream of pumps $P_L$ $P_R$. Such an arrangement allows the clutches to experience the absolute pressures created in the hydraulic control circuits. For the arrangement as shown and considering clutch $C_R$ being connected to the high pressure within the circuit, one can engage the regime associated with clutch $C_L$ by reversing the solenoid settings $S_1$ $S_2$ such that clutch $C_L$ is connected to the high pressure branch H. As shown, pressure in clutch $C_L$ is controlled by the $\Delta p$ across valve $V_2$ and it is this valve which is used to control any oncoming clutch without having an effect on the other already engaged clutch ($C_R$). During overrun operation (i.e. when the vehicle power is taken from the wheels and loads the engine) the solenoid valves $S_1$, $S_2$ may be reversed but the pressure difference required for variator control is small and so operating clutch at the low pressure point of $V_2$ which will require elevated absolute pressures, will not cause an operating problem. Of course a change of regime is not possible during this phase, as an oncoming clutch could not be filled. However, this is not a problem since an overrun shift into low regime can be precluded without a serious deterioration in the drivability of the vehicle.

Figure 6:
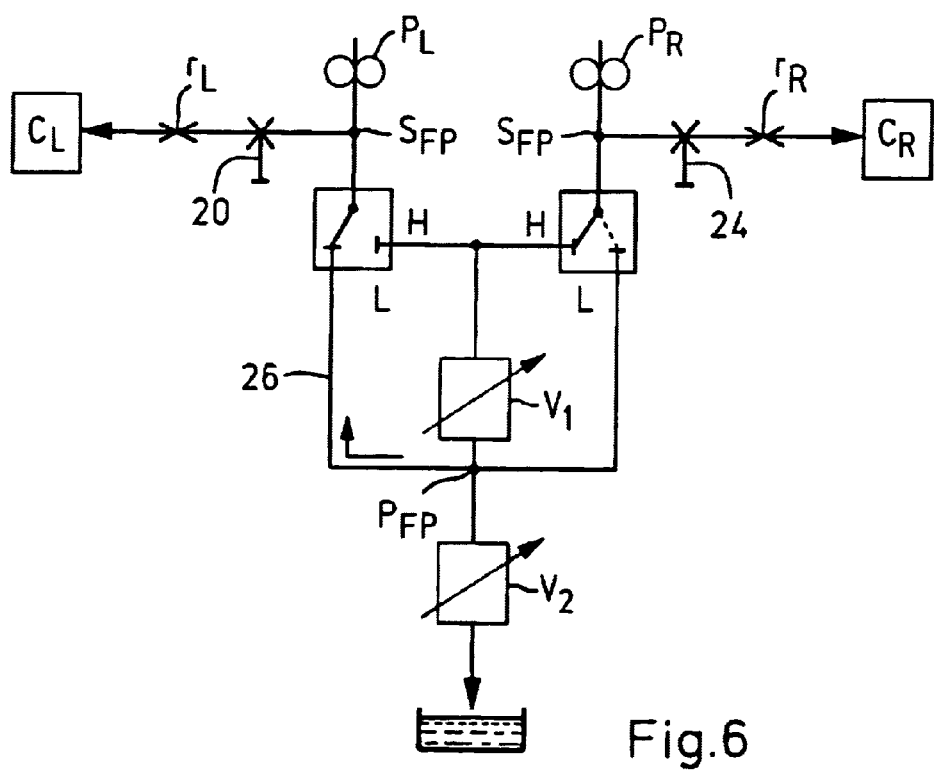

Turning now briefly to FIG. 6, and with clutch $C_R$ engaged the filling of clutch $C_L$ is achieved by opening valve 20 in clutch supply line 22 so as t allow pump $P_L$ to fill the clutch at the lower of the two pressures within the circuit. An appropriate resistance $r_L$ may be used to maintain the variator $\Delta P$ throughout the clutch-filling step. Restricting (or in certain circumstances closing) $V_2$ will cause the flow from pump $P_R$ to be directed along the left-hand branch 26 such that it supplements the flow from pump $P_L$. The system pressures required to fill the clutch varies for any particular fluid viscosity. Whilst this arrangement provides a perfectly acceptable clutch engagement step, one may wish to employ a further system for managing the clutch apply pressures as the plates close together, in order to avoid clutch jerking.

Figure 7:
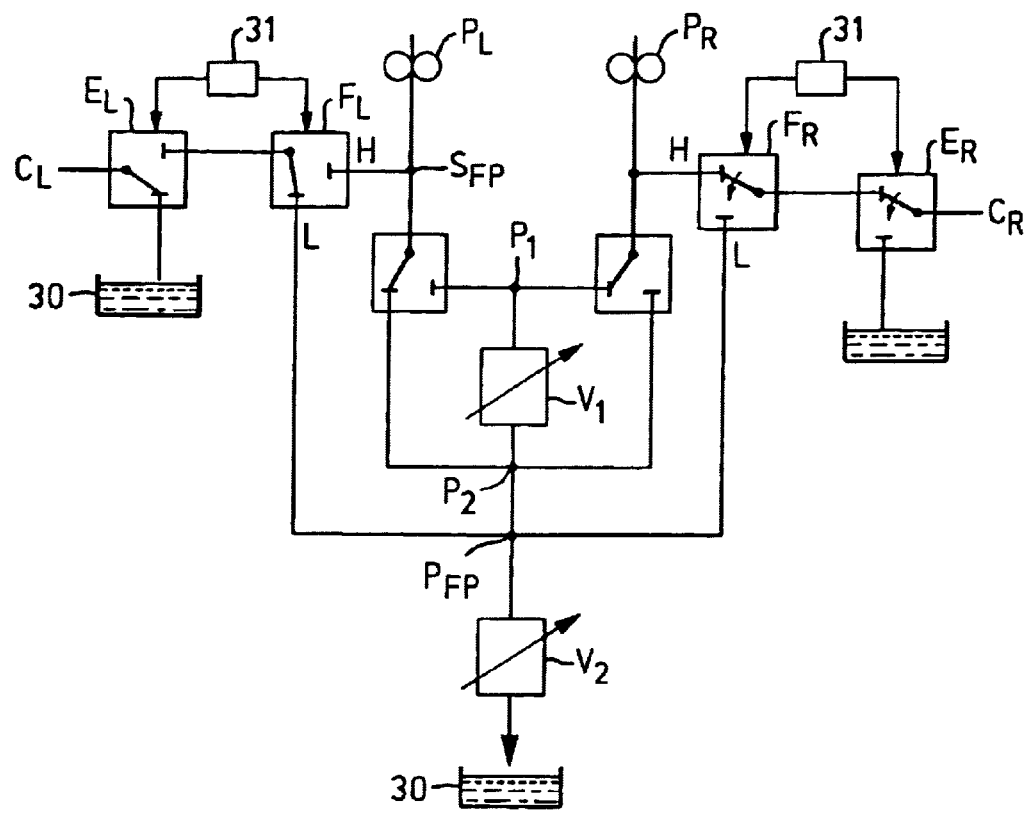

An alternative and possibly more robust arrangement is shown in FIG. 7 in which the above arrangement is supplemented by clutch fill valves $F_L$, $F_R$ between an associated pump and clutch. These valves receive fluid flow from said associated pump either via a primary fill point $P_{FP}$ downstream of said second point $P_2$ but upstream of valve $V_2$ or from a secondary fill point $S_{FP}$ downstream of said pumps $P_L$, $P_R$ but upstream of said first point $P_1$. In addition to valves $F_L$, $F_R$, each clutch is provided with a dump valve labeled as $E_L$, $E_R$. The function of these latter valves E is to connect the clutch with the engaging fluid or to disconnect said flow and causes any fluid within the clutch to drain to a sump shown schematically at 30.

In operation, clutch $C_R$ is fully engaged by ensuring valve $F_R$ is connected to pump $P_R$ and valve $E_R$ isolates the drain to the sump 30 and directs all flow to the clutch. Clutch $C_L$ is disengaged i.e. valve $E_L$ is connected to the sump 30 so that fluid may drain from the clutch but valve $F_L$ is connected to the primary filling point $P_{FP}$ such that line 26 is filled and at the pressure associated with the operation of valve $V_2$. Filling of clutch $C_L$ is commenced by switching valve $E_L$ to connect to valve $F_L$ thus disconnecting the drain to sump 30 and allowing fluid to flow from the primary fill points $P_{FP}$ via valves $F_L$ $E_L$. Valve $V_2$ can be employed to control the fill pressure and can, in extremes shut completely and direct the entire flow from both pumps to clutch $C_L$. Of course, in the process of clutch filling the circuit pressures will vary (increase) but valve $V_1$ alone determines the pressure difference between the pumps and so the variator will be unaffected by the clutch filling process. When clutch $C_L$ is full with hydraulic fluid at the lower pressure, solenoid $F_L$ will switch to the pump connection as for clutch $C_R$ i.e. direct connection to the secondary filling point $S_{FP}$ and valve $V_2$ can then control the system pressures to ensure complete engagement without influencing the variator reaction settings which are controlled by valve $V_1$. The higher-pressures fluid is employed to fully engage clutch $C_L$ and, once engaged, valve $S_1$ will switch to position H changing the transmission to the synchronous setting and the regime change process continues by simply turning off the supply to the unwanted clutch. It will be appreciated that the fill-engage cycle takes place with the continued flows of both pumps without reversing the flow through either side of the control circuit. Consequently, the variator reaction pressures will not change unless the relief valve at one or other pump affects circuit flow. A suitable monitor/control device 31 may be provided for switching valves $E_L$, $F_L$ and $F_R$, $E_R$ as and when necessary. In normal operation, valve $V_2$ is set to create relatively high pressure during the fill process thereby to reduce clutch fill time and this severely restricts flow from the circuit. Consequently, when the clutch is completely filled, circuit pressures will rise sharply since a lack of flow to the clutch will "dead-head" the pumps. This problem may be overcome in a number of ways, one of which is shown in FIG. 8.

Figure 8:
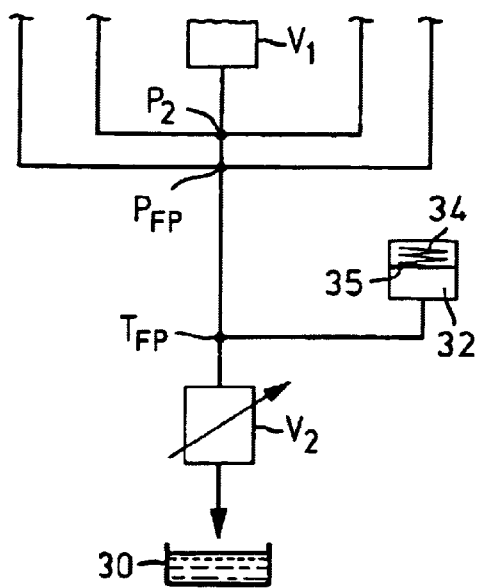

The arrangement of FIG. 8 provides a fluid accumulator 32 for receiving fluid flow once clutch engagement has been completed. The accumulator 32 is connected to the circuit at a tertiary filling point $T_{FP}$ downstream of the primary fill point $P_{FP}$ but upstream of valve $V_2$. Preferably, the accumulator 32 comprises a variable resistance accumulator having, for example, a spring 34 acting against an upper surface of an accumulator plate 35 such that the flow of fluid into the accumulator 32 is at least partially countered by the spring force. By tailoring the spring rate and/or employing a variable rate spring it will be possible to initiate automatic control over the pressures associated with clutch filling. For example, one might have a low spring rate during the initial filling process and a higher spring rate during final fill.

Figure 9:
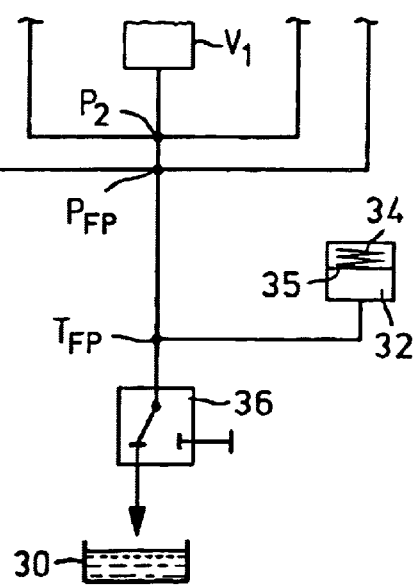

Assuming that regime change or clutch fill/engage takes place at low clutch relative motion, the above accumulator could be relied upon to control the engaged process sufficiently to allow valve $V_2$ to be replaced by a solenoid valve 36 as best seen in FIG. 9. In this arrangement valve 36 comprises a two position valve having a first position in which fluid is directed to sump 30 and a second position which blocks the outlet therefrom and causes fluid to be directed to accumulate at 32. In operation the fill/engage process is achieved by preventing fluid exiting the hydraulic circuit until such engagement is completed. Clutch drag alters the variator position such that the correct ratio is achieved prior to clutch engagement.

Figure 10:
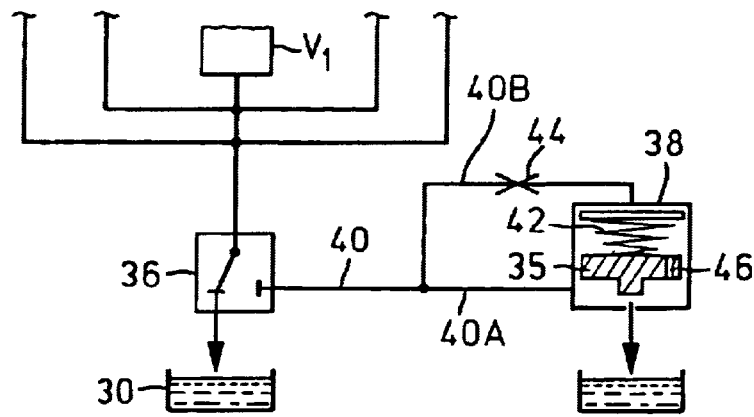

An alternative arrangement would be to substitute a variable rate relief valve for the accumulator 32, noting that the engaged pressure within the clutches would be relatively low since the transmission does not require the oncoming clutch to transmit power. This alternative arrangement is shown in FIG. 10 and the relief valve is shown schematically at 38. In the arrangement of FIG. 10 the relief valve is connected to valve 38 by means of supply pipe 40 having a first branch 40A connected to the pressurising side of the relief valve and a second branch 40B connected to the spring side thereof. This spring is shown schematically at 42. A timing restrictor 44 is provided in the second branch so as to assist in the creation of a variable backpressure. This back pressure having a base minimum valve at time zero and rising thereafter in accordance with a desired profile. To fill the relief valve, the solenoid valve 36 would connect to the relief valve so that hydraulic fluid flows directly to the pressurised side of the valve and accumulates therein at a rate which depends on the pressure and the size of the outlet hole. It will be appreciated that the spring 42 will act to control the pressure within the relief valve and any flow entering via the timing restrictor 44 will enter the relief valve above the spring augmenting the spring force. Circuit pressure will rise with time but without "dead heading" either of the pumps. When clutch engagement has been completed, solenoid 36 would be returned to position shown in FIG. 9 such that hydraulic fluid returns to sump 30. In order to allow hydraulic fluid to drain from the spring side of the accumulator, a small leakage hole 46 is provided through the piston body. The size of this hole is selected such that it has negligible affect on the pressurising of the accumulator but is sufficiently large to allow hydraulic fluid to drain from the spring side once clutch engagement has been completed.

Figure 11:
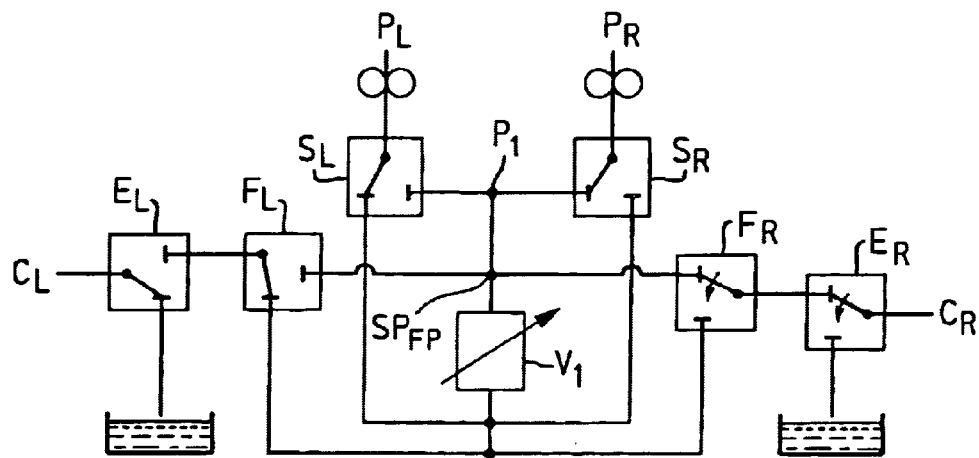

An alternative clutch connection is shown in FIG. 11 from which it will be appreciated that the high pressure supply for clutch engagement is taken from a second primary filling point $SP_{FP}$ upstream of valve V1 but downstream of point P1. The circuit shown is set for right hand side operation with $F_R$ and $E_R$ set to connect clutch $C_R$ to valve $V_1$ and pump $P_R$ being the high pressure pump. Clutch $C_L$ is set to fill with the lower pressure fluid i.e. $E_L$ is connected directly to clutch $C_L$ and $F_L$ is set to $P_{FP}$ i.e. the lower pressure source. In the event that transmission torques are reversed then the settings on valves $S_L$ and $S_R$ are reversed without changing the clutch connections i.e. over run is possible in any regime and reverse operation is possible with the clutch connected to high pressure ($V_1$). For braking, $S_2$ and $S_R$ can be connected to $V_1$ without changing the clutch conditions. Additionally, clutch control may be added by changing the position of valve F such that it connects to the primary filling point $P_{FP}$.

Figure 12:
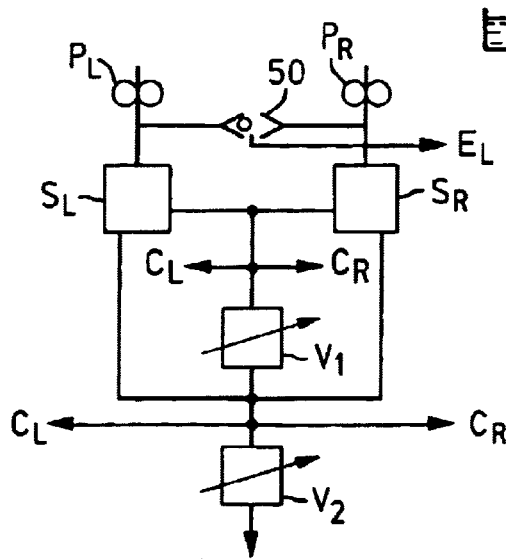

In order to provide the variator with hydraulic end load, one may employ the arrangement of FIG. 12. In this arrangement a valve commonly referred to as a "higher pressure wins" valve 50 is connected between the two supply pipes and acts to supply high pressure fluid for end load purposes. The conventional "lower pressure wins" valve, such as that disclosed in PCT GB/00956 can be dispensed with in the present arrangement as point $P_{FP}$ provides the lower of the two pressures defining the variator differential control in the circuit and can be employed to provide hydraulic fluid at low pressure in order to fill the end load chamber. Operation of the end load mechanism will be the same as that which has gone before in as much as the hydraulic chamber is filled from the higher pressure wins valve 50 as controlled at $P_{FP}$ by the circuit valving $V_1$.

Figure 3:
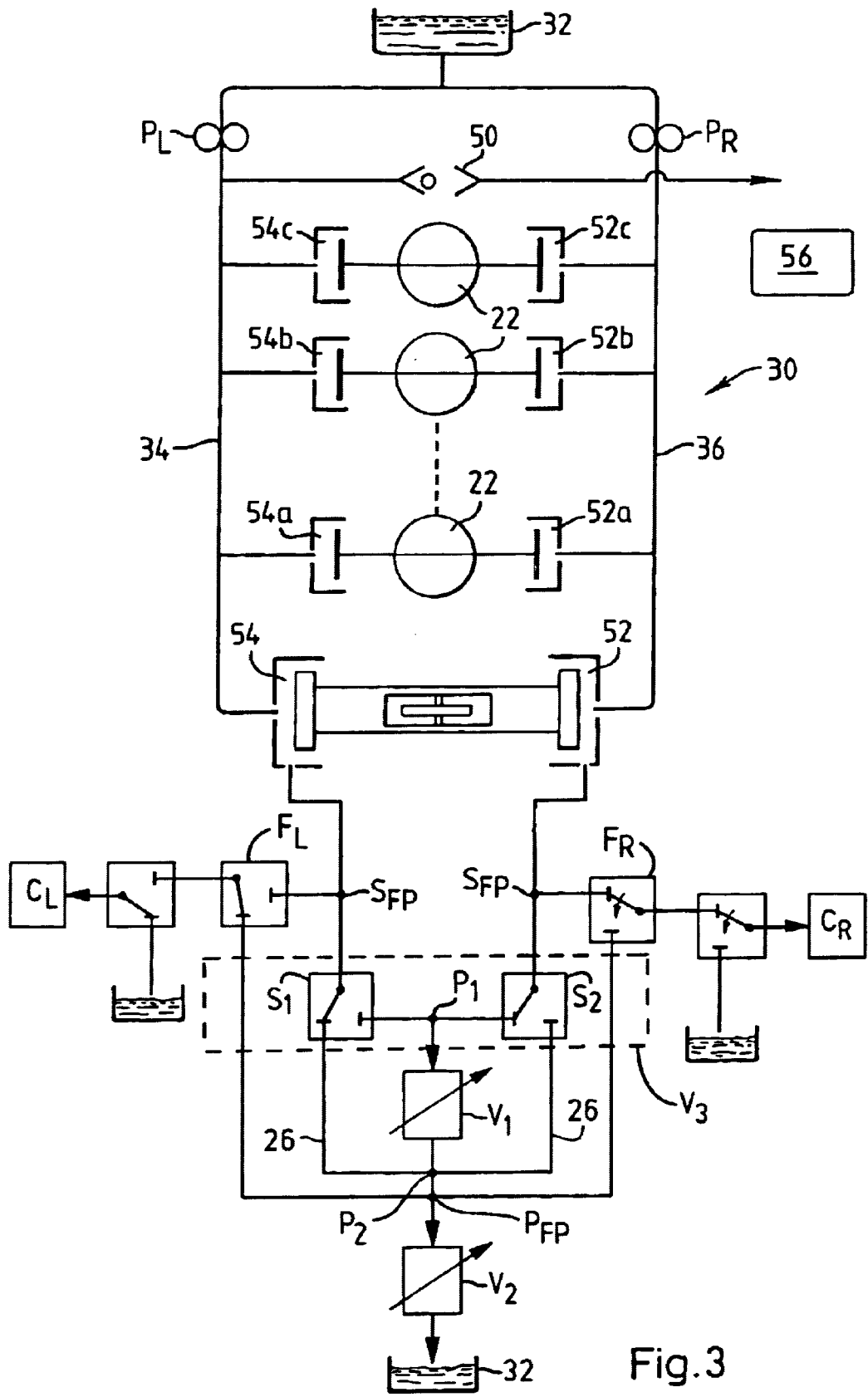
FIG. 3 is a diagrammatic representation of one form of hydraulic control circuit for a variator as adapted by at least one arrangement of the present invention.

It will be appreciated that valve $V_1$ may be operated to vary the back pressure and, hence, control the pressures within the master roller control pistons 52, 54 and slaves 52a–52c and 54a–54c as shown in FIG. 3.

It will also be appreciated that one single electronic monitor/controller may be provided in order to perform all the monitor/control functions disclosed herein. Such a monitor/controller is shown schematically at 56 in FIG. 3.

What is claimed is:

1. An hydraulic control circuit for a CVT transmission having a variator and a plurality of regime change clutches comprising:

first and second hydraulic supply pipes;

first and second hydraulic pumps associated with said first and second supply pipes, respectively, for pumping hydraulic fluid therethrough and for raising its pressure;

a first hydraulic pressure control valve for controlling the pressure of hydraulic fluid to be supplied to roller control pistons of the variator;

a second hydraulic pressure control valve for controlling the pressure of hydraulic fluid to be supplied to said regime change clutches of the transmission, wherein said first and second hydraulic pressure valves are connected in flow series; and at least one fluid directing valve for selectively directing flow from each of said first and second hydraulic pumps, respectively, to a first point upstream of said first valve and to a second point downstream of said first valve but upstream of said second valve.

2. An hydraulic control circuit as claimed in claim 1 in which the at least one fluid directing valve comprises first and second two-way valves, each of said two-way valves having first and second outlets, each of said first outlets being connected for supplying fluid to said first point and each of said second outlets being connected for supplying fluid to said second point.

3. An hydraulic control circuit as claimed in claim 1 in which said first hydraulic pressure control valve comprises a pressure raising valve for controlling pressure upstream thereof for supply to said variator and in which any flow through said first hydraulic pressure control valve is combined with any flow being directed directly to said second point for subsequent supply to said second hydraulic pressure control valve.

4. An hydraulic control circuit as claimed in claim 1 and further including first and second direct supply branches for connecting said at least one fluid directing valve to said second point, and further including first and second flow restrictors for restricting the flow of fluid in respective first and second direct supply branches such that resistance in each branch is substantially equal to total resistance in a supply route through the first hydraulic pressure control valve.

5. An hydraulic control circuit as claimed in claim 4 including a second flow restrictor within the supply route to the first hydraulic pressure control valve and in which total hydraulic flow resistance of said second flow restrictor and hydraulic flow resistance in the first hydraulic pressure control valve is substantially equal to total flow resistance in the respective hydraulic flow restrictors and any hydraulic flow resistance within respective supply branches.

6. An hydraulic control circuit as claimed in claim 4 and further including a vehicle brake monitor and switching means operable to switch the at least one fluid directing valve to cause all the fluid from said hydraulic pumps to be directed to said first hydraulic pressure control valve upon detection of vehicle braking.

7. An hydraulic control circuit as claimed in claim 1 and including switching means operable to switch the at least one fluid directing valve to cause all the fluid from hydraulic pumps to be directed to said second point rather than said first point.

8. An hydraulic control circuit as claimed in claim 1 and including first and second regime change clutches respectively and in which each clutch is connected for receiving fluid from a point downstream of said hydraulic pumps.

9. An hydraulic control circuit as claimed in claim 8 and further including a flow restrictor in the supply to each clutch, thereby to maintain a predetermined pressure within the supply leading thereto.

10. An hydraulic control circuit as claimed in claim 8 and further including a dump value for each clutch acting in a first position to direct flow to said associated clutch and in a second position acting to allow fluid to drain therefrom but preventing fluid flowing thereto.

11. An hydraulic control circuit as claimed in claim 1 in which each clutch supply includes a clutch fill valve between an associated pump and said clutch, said clutch fill valve receiving fluid flow from said associated pump either via a primary fill point downstream of said second point but upstream of said second hydraulic pressure valve or from a secondary fill point downstream of said hydraulic pumps but upstream of said first point.

12. An hydraulic control circuit as claimed in claim 11 in which said secondary fill point is upstream of said at least one fluid directing valve.

13. An hydraulic control circuit as claimed in claim 12 including control means for controlling clutch fill valves so as to cause fluid to be supplied from the primary fill point during a clutch fill step and from the secondary fill point during a clutch engage step.

14. An hydraulic control circuit as claimed in claim 11 and including control means for controlling said at least one fluid directing valve to direct fluid from both hydraulic pumps to a clutch via said secondary fill point.

15. An hydraulic control circuit as claimed in claim 1 and further including a fluid accumulator for receiving fluid flow once clutch engagement has been completed.

16. An hydraulic control circuit as claimed in claim 15 in which said accumulator receives fluid from a tertiary filling point upstream of said second hydraulic pressure valve but downstream of the primary filling point.

17. An hydraulic control circuit as claimed in claim 16 and in which said second hydraulic pressure valve comprises a solenoid valve.

18. An hydraulic control circuit as claimed in claim 1 and further including a variable rate relief valve and in which said second hydraulic pressure valve comprises a solenoid valve, said second hydraulic pressure valve in a first position acting to direct flow through said second hydraulic pressure valve and to a sump and in a second position acting to direct fluid to said variable rate relief valve.

19. An hydraulic control circuit as claimed in claim 18 in which said variable rate relief valve comprises a spring loaded pressure relief valve having a timing restrictor circuit for receiving a portion of the flow and directing it to the spring side of the accumulator, thereby to assist the spring affect and increase the pressure within the hydraulic circuit.

20. An hydraulic control circuit as claimed in claim 19 in which said pressure relief valve includes a drain for draining any fluid accumulated on the spring side of said valve.

21. An hydraulic control circuit as claimed in claim 1 and in which the transmission includes an hydraulically actuated end load mechanism, said mechanism being supplied at the higher of the two pressures created by pumps.

22. An hydraulic control circuit as claimed in claim 21 and further including a pressure sensitive valve connected for receiving hydraulic fluid from both said hydraulic pumps and for directing only the fluid at the higher pressure to the end loading mechanism.

23. An hydraulic control circuit as claimed in any claim 1 and in which the transmission includes an hydraulically actuated end load mechanism, said end load mechanism being supplied at the lowest pressure within the hydraulic circuit.

24. An hydraulic control circuit as claimed in claim 23 and further including switching means for switching the supply of fluid to the end load mechanism between the lower and the higher pressures within the circuit.

25. An hydraulic control circuit as claimed in claim 1, wherein said at least one fluid directing valve comprises two fluid directing valves.

26. A continuously-variable-transmission having an hydraulic control circuit as claimed in claim 1.

* * * * *